United States Patent
Esaki

(10) Patent No.: US 7,471,338 B2
(45) Date of Patent: Dec. 30, 2008

(54) SYNCHRONOUS IMAGE SIGNAL DATA GENERATOR

(75) Inventor: Kotaro Esaki, Osaka (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 11/028,866

(22) Filed: Jan. 5, 2005

(65) Prior Publication Data
US 2005/0231638 A1    Oct. 20, 2005

(30) Foreign Application Priority Data
Mar. 30, 2004   (JP) ............... 2004-098646

(51) Int. Cl.
 H04N 5/06  (2006.01)
 H04N 9/45  (2006.01)
 H04N 9/455 (2006.01)

(52) U.S. Cl. ............ 348/521; 348/524; 348/464; 348/532; 348/540; 348/542

(58) Field of Classification Search ......... 348/464, 348/524, 532, 540, 542
See application file for complete search history.

(56) References Cited

U.S. PATENT DOCUMENTS

| | | | | |
|---|---|---|---|---|
| 4,814,875 A | | 3/1989 | Oldershaw | |
| 5,229,853 A | * | 7/1993 | Myers | 348/458 |
| 5,274,451 A | * | 12/1993 | Koblitz et al. | 348/525 |
| 5,367,337 A | * | 11/1994 | Pyle et al. | 348/521 |
| 5,696,603 A | * | 12/1997 | Toyomura et al. | 358/3.02 |
| 5,929,923 A | * | 7/1999 | Yamauchi et al. | 348/538 |
| 5,953,071 A | * | 9/1999 | Van Zon | 348/544 |
| 6,172,716 B1 | * | 1/2001 | Karlock | 348/575 |
| 6,522,364 B1 | * | 2/2003 | Suzuki et al. | 348/524 |
| 7,417,687 B2 | * | 8/2008 | Chen | 348/525 |

FOREIGN PATENT DOCUMENTS

| | | |
|---|---|---|
| JP | 2-268093 | 11/1990 |
| JP | 3-113982 | 5/1991 |

* cited by examiner

*Primary Examiner*—Brian P Yenke
(74) *Attorney, Agent, or Firm*—McDermott Will & Emery LLP

(57) ABSTRACT

In order to reduce the circuit scale and the manufacturing cost by decreasing the amount of data to be stored, a synchronizing signal data generating circuit outputs, at each timing, relative synchronizing signal data showing the ratio of a synchronizing signal level to an amplitude level of the synchronizing signal, a multiplier multiplies synchronizing signal amplitude level data, a divider divides by the maximum value N of image signal data which can be outputted from the synchronizing signal data generating circuit, thereby the synchronizing signal data showing actual synchronizing signal level is provided, and an adder adds input image signal data thereto, whereby output image signal data, in which the synchronizing signal data is superposed on the input image signal data, is generated.

5 Claims, 7 Drawing Sheets

| COUNTER VALUE | FORMAT 1 | FORMAT 2 | FORMAT 3 |
|---|---|---|---|
| 0 | 0 | 0 | 0 |
| 1 | 0 | 0 | 1 |
| 2 | 0 | 0 | 2 |
| 3 | 0 | 2 | 3 |
| 4 | 4 | 4 | 4 |
| 5 | 8 | 6 | 5 |
| 6 | 8 | 8 | 6 |
| 7 | 8 | 8 | 7 |
| 8 | 8 | 8 | 8 |

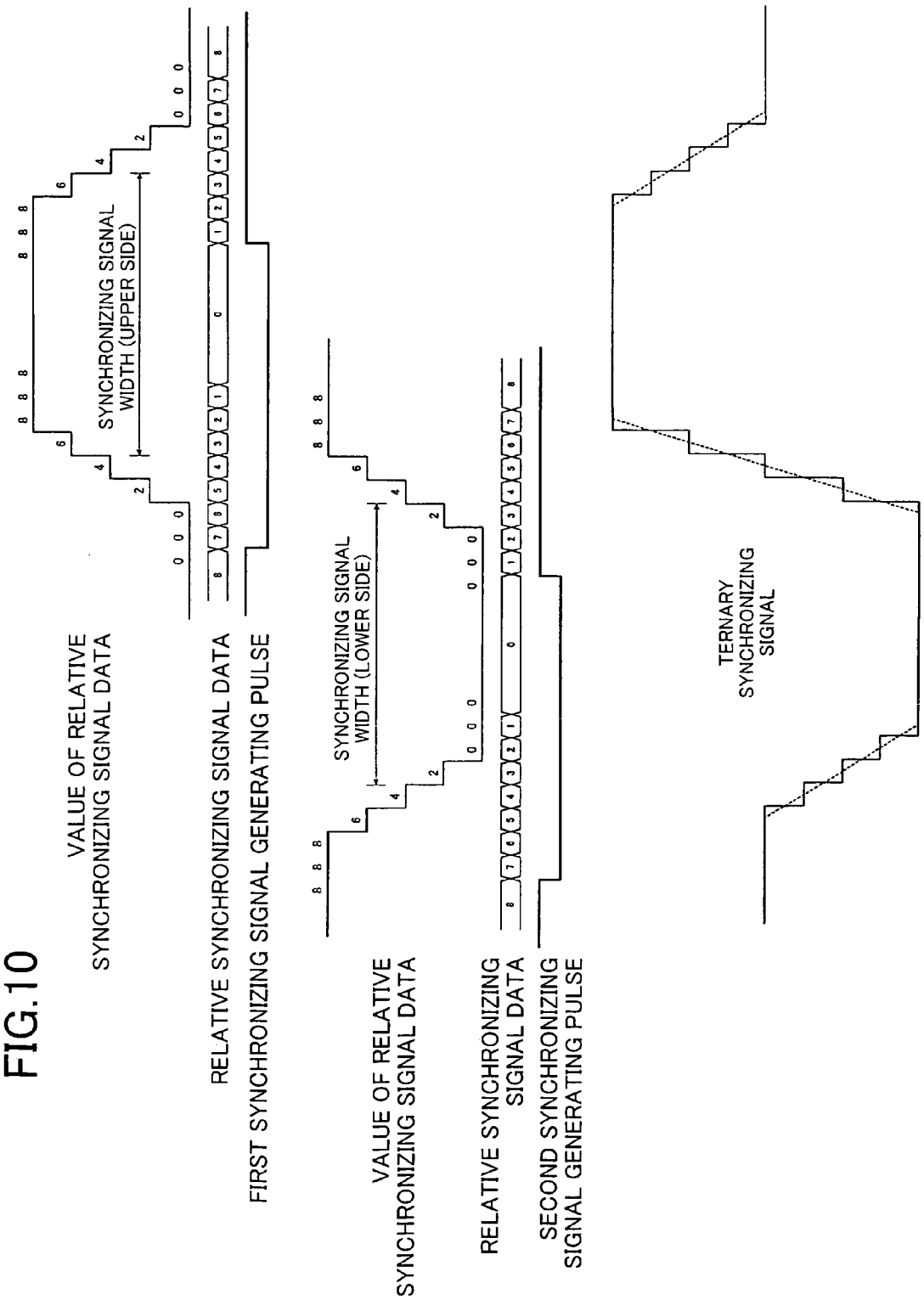

FIG.11 -- *PRIOR ART* --
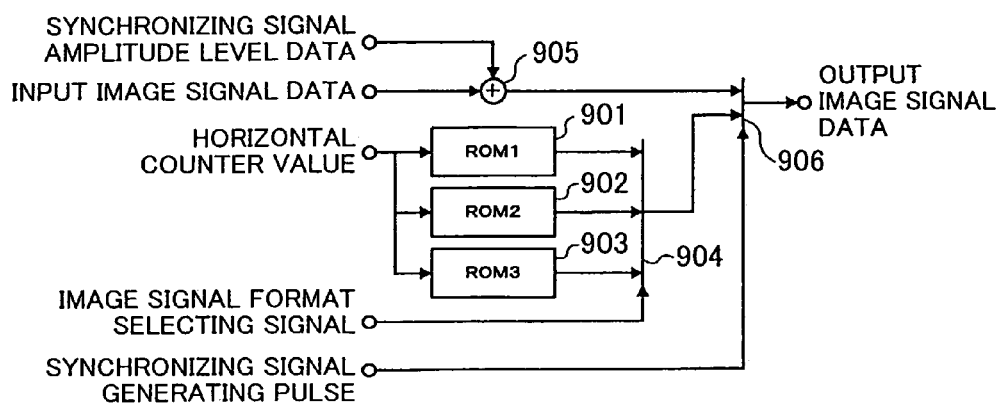
FIG.12 -- *PRIOR ART* --
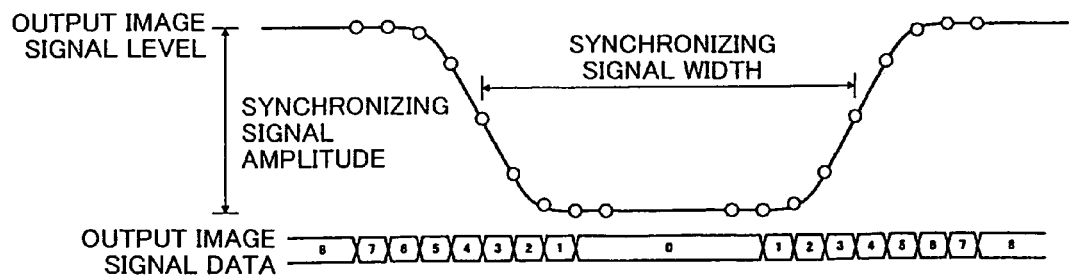

SYNCHRONOUS IMAGE SIGNAL DATA GENERATOR

CROSS REFERENCE TO RELATED APPLICATION

This nonprovisional application claims priority under 35 U.S.C. §119(a) on Patent Application No. 2004-098646 filed in Japan on Mar. 30, 2004, the entire contents of which are hereby incorporated by reference.

BACKGROUND OF THE INVENTION

1. Field of the Invention

The present invention relates to an image signal data generator for generating and outputting image signal data having synchronizing signal patterns corresponding to prescribed image signal formats.

2. Description of the Prior Art

In an image signal data generator which outputs image signal data processed digitally, a process of superposing synchronizing signal data such as horizontal synchronizing signal data or vertical synchronizing signal data on input image signal data is performed. As for patterns of the synchronizing signals, various patterns are applied due to diversity of image signal formats.

As an image signal data generator in which a process of superposing synchronizing signals is performed as described above, one provided with ROMs 901 to 903 storing synchronizing signal data showing a synchronizing signal level for each prescribed timing, as shown in FIG. 11 for example, is well-known. In detail, the ROMs 901 to 903 store synchronizing signal data for respective image signal formats of plural types, and synchronizing signal data is read out corresponding to a horizontal counter value counted up at each prescribed timing. Among the pieces of synchronizing signal data outputted from respective ROMs 901 to 903, one of them is selected and outputted corresponding to an image signal format selecting signal by a selector 904.

The synchronizing signal data selected by the selector 904, and input image signal data to which synchronizing signal amplitude level data is added by an adder 905 are inputted into a selector 906, and a selection is performed according to a synchronizing signal generating pulse showing the synchronizing signal output period, whereby output image signal data, as shown in FIG. 12 for example, is outputted (see, for example, Japanese Patent Application Laid-open No. 2-268093 and Japanese Patent Application Laid-Open No. 3-113982). Here, the reason why the synchronizing signal amplitude level data is added to the input image signal data is to raise an input image signal, in which the black level is "0" in general, to the amplitude level of the synchronizing signal. More specifically, assuming that the value of the input image signal data is 0 to 255 and the value of the synchronizing signal amplitude level data is 0 to 8 (that is, the maximum value is 8), for example, the maximum value becomes the black level for the output image signal data, whereby a process of adding 8 to the input image signal data is performed by the adder 905.

However, in the conventional image signal data generator as described above, synchronizing signal data directly showing the synchronizing signal level is stored on the ROMs 901 to 903, whereby the amount of data is large, which may cause a problem of increasing the circuit scale and the manufacturing cost. This problem becomes more prominent along with the diversity of image signal formats. Further, in such a configuration that synchronizing signal data is selected by the selector 906 and made to be the output image signal data as described above, the adder 905 must be provided in order to conform the black level of the input image signal data to the synchronizing signal data. This may also cause an increase in the circuit scale and the manufacturing cost.

SUMMARY OF THE INVENTION

In view of the above-mentioned conventional problems, the present invention has been devised for the purpose of reducing the circuit scale and the manufacturing cost of an image signal data generator by reducing the amount of data to be stored and simplifying the circuit.

In order to achieve the aforementioned object, a first image signal data generator of the present invention is an image signal data generator for generating output image signal data by superposing synchronizing signal data on input image signal data, and outputting the output image signal data, which generator comprises: a memory for storing relative synchronizing signal data showing the ratio of a synchronizing signal level to the amplitude level of a synchronizing signal; a multiplier for multiplying the relative synchronizing signal data read out from the memory by synchronizing signal amplitude level data showing the amplitude level of the synchronizing signal, and generating the synchronizing signal data; and an adder for adding the synchronizing signal data to the input image signal data.

With this configuration, the relative synchronizing signal data, having smaller amount of data than that of the synchronizing signal data directly showing the synchronizing signal level, is stored on the memory. Further, since the input image signal data and the synchronizing signal data are summed, there is no need to conform both levels.

Further, a second image signal data generator according an embodiment of the present invention is the first image signal data generator in which the memory is so configured that pieces of relative synchronizing signal data corresponding to respective synchronizing signal patterns of plural kinds of image signal formats are stored, and a piece of relative synchronizing signal data selected by an image signal format selecting signal is read out.

With this configuration, the amount of data stored on the memory is suppressed significantly comparing with the total of the synchronizing signal data directly showing the synchronizing signal level.

Further, a third image signal data generator according an embodiment of the present invention is the first image signal data generator in which the memory may be a read only memory or a register.

With this configuration, the storage capacity of the memory is suppressed, and flexible image signal data is generated since relative synchronizing signal data corresponding to various image signal formats are written on the register.

Further, a fourth image signal data generator is an image signal data generator for generating output image signal data by superposing synchronizing signal data on input image signal data, and outputting the output image signal data, which generator comprises: a memory for storing first relative synchronizing signal data showing a ratio of a level of a first synchronizing signal corresponding to a first image signal format to an amplitude level, and associated relative synchronizing signal data, from which second relative synchronizing signal data showing a ratio of a level of a second synchronizing signal corresponding to a second image signal format to the amplitude level by being synthesized with the first relative synchronizing signal data is generated; an adder for adding the first relative synchronizing signal data to the associated relative synchronizing signal data, and generating the second relative synchronizing signal data; a multiplier for multiplying the first relative synchronizing signal data or the second relative synchronizing signal data, by synchronizing signal amplitude level data showing the amplitude level, and generating first or second synchronizing signal data; and a superposing unit for superposing the first or second synchronizing signal data on the input image signal data.

Further, a fifth image signal data generator is an image signal data generator for generating output image signal data by superposing synchronizing signal data on input image signal data, and outputting the output image signal data, which generator comprises: a memory for storing first relative synchronizing signal data showing a ratio of a level of a first synchronizing signal corresponding to a first image signal format to an amplitude level, and associated relative synchronizing signal data showing a ratio of a level of associated synchronizing signal data to the amplitude level, wherein from the associated synchronizing signal data, by being synthesized with the first synchronizing signal data showing the first synchronizing signal level, second synchronizing signal data showing a second synchronizing signal level corresponding to a second image signal format is generated; a multiplier for multiplying each of the first relative synchronizing signal data and the associated relative synchronizing signal data, by synchronizing signal amplitude level data showing the amplitude level, respectively, and generating the first synchronizing signal data and the associated synchronizing signal data; an adder for adding the first synchronizing signal data to the associated synchronizing signal data, and generating the second synchronizing signal data; and a superposing unit for superposing the first synchronizing signal data or the second synchronizing signal data on the input image signal data.

With these configurations, it is possible to easily generate output image signal data corresponding to, for example, a ternary synchronizing signal, a binary synchronizing signal and the like, while suppressing the storage capacity of the memory.

BRIEF DESCRIPTION OF THE DRAWINGS

FIG. 10 is an illustration showing an example of relative synchronizing signal data of the embodiment 3.

FIG. 11 is a block diagram showing the configuration of a conventional image signal data generator.

FIG. 12 is an illustration showing an example of an output image signal waveform generated in the conventional image signal data generator.

DETAILED DESCRIPTION OF THE PREFERRED EMBODIMENTS

Hereinafter, embodiments of the present invention will be described in detail with reference to the drawings.

Embodiment 1

Figure 1:
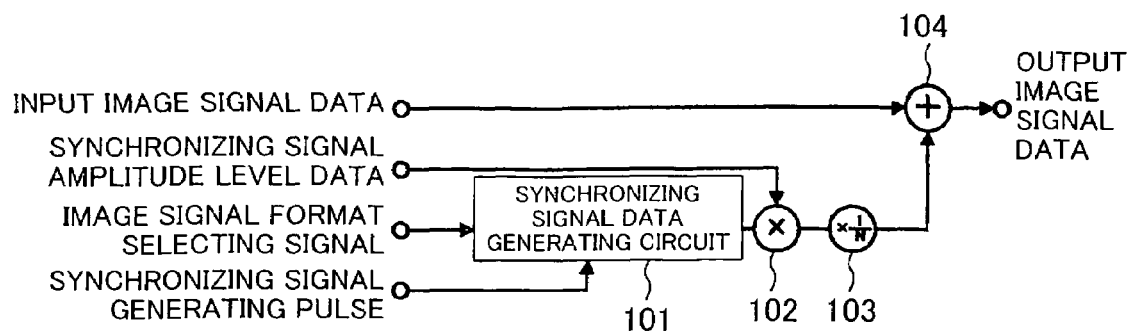
FIG. 1 is a block diagram showing the configuration of an image signal data generator of an embodiment 1.

As shown in FIG. 1, an image signal data generator includes, a synchronizing signal data generating circuit 101 which outputs relative synchronizing signal data showing the ratio of a synchronizing signal level to an amplitude level of a synchronizing signal (the maximum value which can be outputted when the both levels are the same is assumed to be N), a multiplier 102 which outputs a product obtained by multiplying the relative synchronizing signal data by synchronizing signal amplitude level data corresponding to an image signal format, a divider 103 which divides the output from the multiplier 102 by the maximum value N, and an adder 104 which adds the output from the divider 103 to input image signal data. In the present embodiment, an explanation is given on an assumption that the input image signal data within a time range including before and after the synchronizing signal width is indicated as being at the black level by a value "0".

Figure 2:
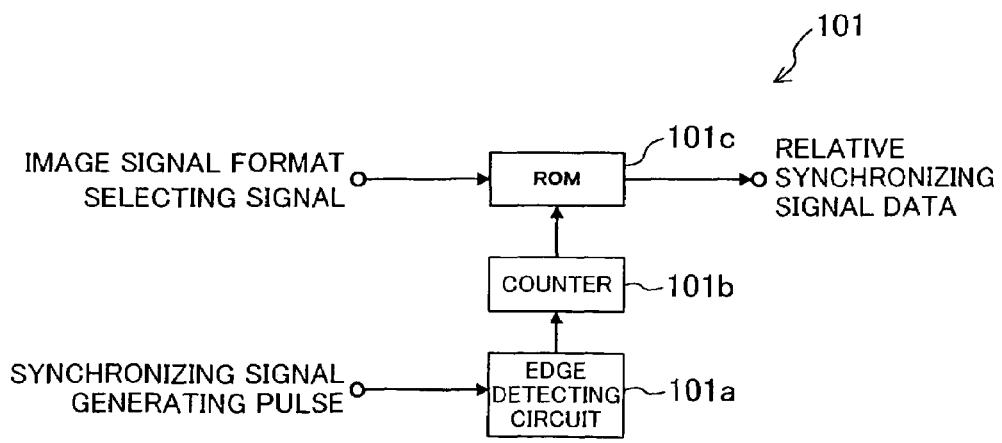
FIG. 2 is a block diagram showing the specific configuration of a synchronizing signal data generating circuit 101 of the embodiment 1.

The synchronizing signal data generating circuit 101 specifically includes, as shown in FIG. 2 for example, an edge detecting circuit 101a for detecting a leading edge or a trailing edge of a synchronizing signal generating pulse, a counter 101b for counting up or counting down a counter value according to a prescribed clock signal, not shown, corresponding to the detected edge timing and the transition direction of the edge, and a ROM 101c for outputting relative synchronizing signal data corresponding to the counter value and an image signal format selecting signal.

Figure 3:
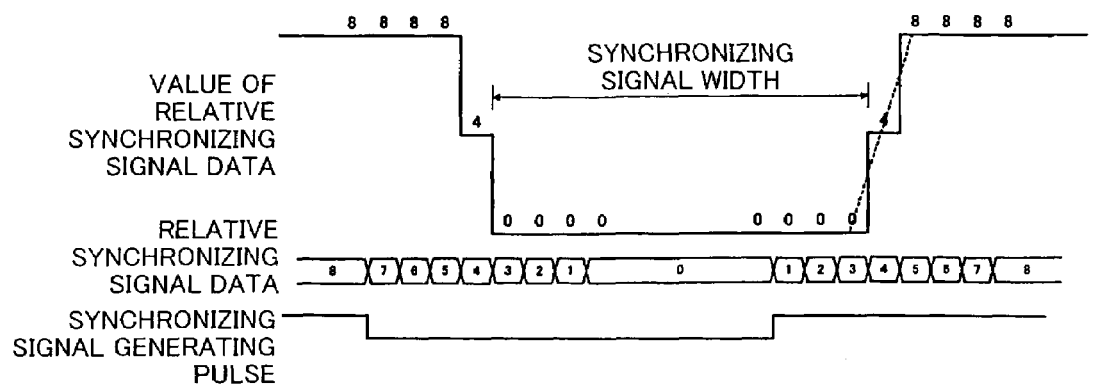
FIG. 3 is an illustration showing an example of relative synchronizing signal data of the embodiment 1.
Figure 4:
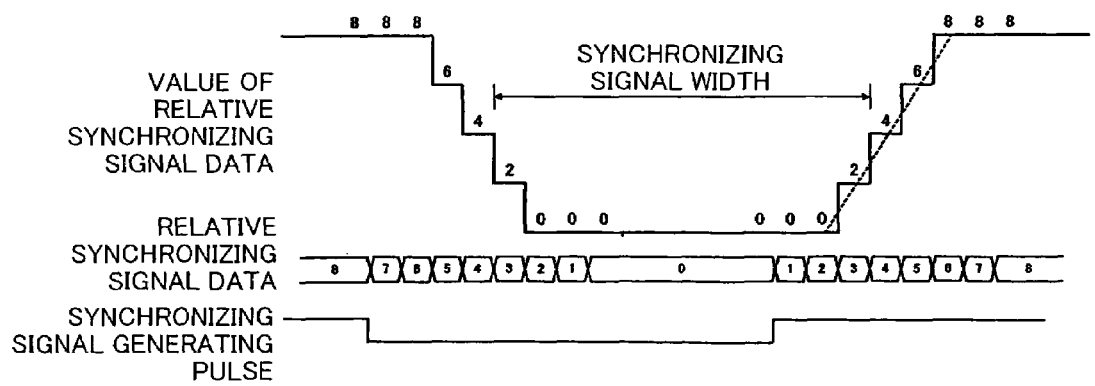
FIG. 4 is an illustration showing another example of the relative synchronizing signal data of the embodiment 1.
Figures 5, 6:
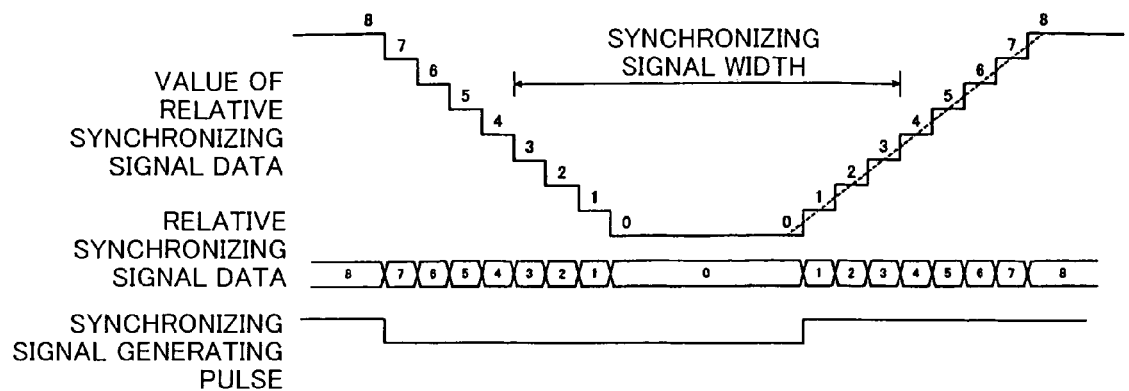
FIG. 5 is an illustration showing yet another example of the relative synchronizing signal data of the embodiment 1.
FIG. 6 is an illustration showing exemplary storage contents of a ROM 101c of the embodiment 1.

In detail, the counter 101b is so configured, as shown in FIGS. 3 to 5 for example, that when a synchronizing signal generating pulse falls when the counter value is "8", the counter value is counted down sequentially, and when the counter value comes to "0", the value "0" is outputted continuously. Then, when the synchronizing signal generating pulse rises, the counter value is counted up sequentially, and when the counter value comes to "8", the value "8" is outputted continuously.

In the ROM 101c, relative synchronizing signal data for each timing on the basis of a synchronizing signal generating pulse for each image signal format is stored on an area defined by the counter value and an image signal format selecting signal, as shown in FIG. 6 for example.

In the image signal data generator configured as described above, the synchronizing signal data generating circuit 101 outputs relative synchronizing signal data for each timing on the basis of a synchronizing signal generating pulse for an image signal format indicated by an image signal format selecting signal.

The multiplier 102 multiplies the relative synchronizing signal data by synchronizing signal amplitude level data, and the divider 103 divides the result of the multiplication by the maximum value N of the relative synchronizing signal data. Thereby, synchronizing signal data showing the actual synchronizing signal level is outputted from the divider 103.

Then, the synchronizing signal data is added to input image signal data by the adder 104, and output image signal data in which the synchronizing signal data is superposed on the input image signal data is generated and outputted.

In this way, by storing relative synchronizing signal data showing the ratio of the synchronizing signal level to the amplitude level of the synchronizing signal on the ROM 101c, it is possible to suppress the amount of data stored on the ROM 101c so as to reduce the storage capacity of the ROM 101c. Further, the circuit can also be simplified since there is no need to perform an addition for conforming the black level of the input image signal data to the synchronizing signal data. Thus, the circuit scale and the cost can be reduced easily.

Note that the range of the counter value held by the counter 101b is not limited to "0 to 8", and may be set corresponding to the frequency of the clock signal or the synchronizing signal width. Further, the types of image signal formats are not limited to three types but may be set in various ways. Moreover, the maximum value N of the relative synchronizing signal data is not limited to "8", but may be set in various ways corresponding to the accuracy (resolution) or the like of the required synchronizing signal level.

Further, in cases where data which is N times the input-output image signal data as described above is used as input-output image signal data, or where each operation is performed assuming that values stored on the ROM 101c are values between 0 to 1, for example, the divider 103 is not necessarily provided. That is, there is no problem if a data format (interpretation of decimal point or the like) of a value outputted from the multiplier 102 or the divider 103 and that of input image signal data correspond to each other.

Further, although it is easily achievable to use one ROM 101c by suppressing the amount of data as described above, the present invention is not limited to this configuration. A number of ROMs 101c may be provided so as to simultaneously output relative synchronizing signal data corresponding to a plural types of image signal formats, and any piece of data may be selected corresponding to an image signal format selecting signal.

Embodiment 2

Figure 7:
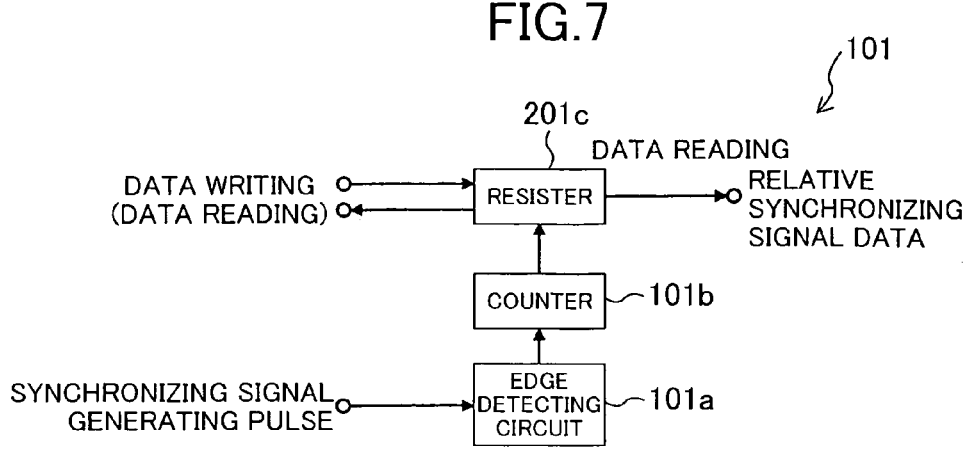
FIG. 7 is a block diagram showing the specific configuration of a synchronizing signal data generating circuit 101 in an image signal data generator of an embodiment 2.
Figure 8:
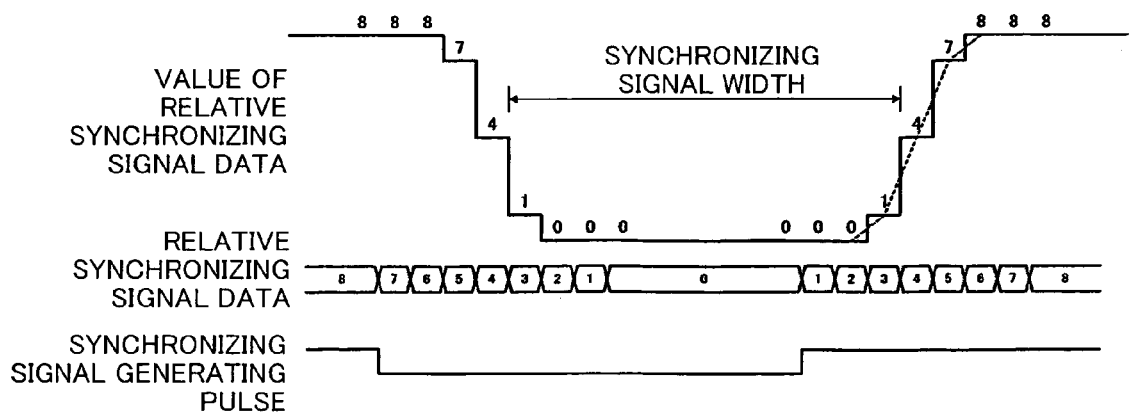
FIG. 8 is an illustration showing an example of relative synchronizing signal data of the embodiment 2.

In the configuration described as the embodiment 1, a register 201c may be used instead of the ROM 101c (or together with the ROM 101c) as shown in FIG. 7. In the register 201c, relative synchronizing signal data corresponding to an image signal format is written as required by a control unit not shown. Thereby, it is possible to generate output image signal data flexibly corresponding to various image formats with a small circuit scale. In particular, even in the state where the image signal data generator is mounted in an imaging apparatus, a subtle adjustment of synchronizing signal waveform is possible, as shown in FIG. 8 for example.

Although the register 201c is enough to have a capacity for storing relative synchronizing signal data corresponding to one image signal format, it is not limited to this configuration. The register 201c may be so configured as to be capable of switching corresponding to an image signal format selecting signal as same as the embodiment 1, by storing relative synchronizing signal data corresponding to plural types of image signal formats.

Embodiment 3

Figure 9:
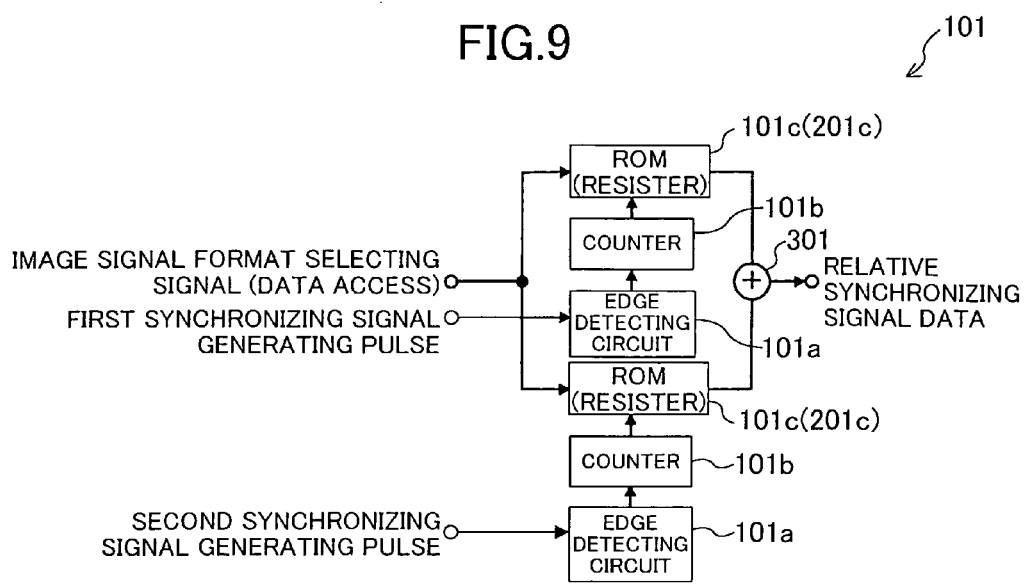
FIG. 9 is a block diagram showing the specific configuration of a synchronizing signal data generating circuit 101 in an image signal data generator of an embodiment 3.

Instead of the synchronizing signal data generating circuit 101 described for FIGS. 2 and 7, the present invention may have such a configuration, as shown in FIG. 9, that plural sets (two sets in the example shown in the Figure) of the edge detecting circuit 101a, the counter 101b and the ROM 101c (or the register 201c) are arranged in parallel, and an output from each ROM 101c is added by an adder 301, so that relative synchronizing signal data is outputted.

Each edge detecting circuit 101a is so configured as to detect an edge in a first or second synchronizing signal generating pulse, respectively.

With the aforementioned configuration, it is easy to generate synchronizing signal data corresponding to a high definition (HD) format defined by standards such as Rec, ITU-RBT.709-5, or ITU-RBT.1358, ITU-RBT.470-6, and SMPTE170M (that is, synchronizing signal data showing a waveform called ternary synchronizing signal having an amplitude with the same up and down level with reference to the black level), and synchronizing signal data corresponding to a standard definition (SD) format, as shown in FIG. 10 for example. That is, synchronizing signal data of the SD format in which the level changes from H (high) to L (low) to H (high) with reference to the black level is outputted from one ROM 101c, and new data (data indicating the relationship of both HD and SD formats) in which the level changes from L to H to L is outputted from the other ROM 101c. By combining these pieces of data, synchronizing signal data for HD format can be generated. Further, by keeping the level of the first synchronizing signal generating pulse at constant (thus, the output of the other ROM 101c described above is held at the L level) and only changing the level of the second synchronizing signal generating pulse, synchronizing signal data corresponding to the SD format can be generated.

Note that the present invention is not limited to the aforementioned configuration in which the added result by the adder 301 is multiplied by the synchronizing signal amplitude level data by the multiplier 102. For example, two multipliers 102 may be provided, and an output from each ROM 101c may be multiplied by the synchronizing signal amplitude level data, and the result of multiplication may be added by the adder 301.

Further, the pieces of synchronizing signal data generated as described above are not limited to be added to the input image signal data as described in the embodiment 1, but either one may be selected by a selector. In order to perform an addition for corresponding the black level of the input image signal data to the synchronizing signal data, the circuit scale may become larger in some degree. However, an aspect of easily achieving an effect of suppressing the storage capacity of the ROM 101c or the like is the same.

As described above, the image signal data generator is capable of reducing the amount of data significantly and simplifying the circuit by storing relative synchronizing signal data showing the ratio of synchronizing signal level to the amplitude level of the synchronizing signal and by adding input image signal data to the synchronizing signal data. Accordingly, the generator has an effect of reducing the circuit scale and manufacturing cost easily, and is useful as an image signal data generator or the like for generating and outputting image signal data having a synchronizing signal pattern corresponding to a prescribed image signal format.

What is claimed is:

1. An image signal data generator for generating output image signal data by superposing synchronizing signal data on input image signal data, and outputting the output image signal data, the generator comprising:
   a memory for storing relative synchronizing signal data showing a ratio of a synchronizing signal level to an amplitude level of a synchronizing signal;
   a multiplier for multiplying the relative synchronizing signal data read out from the memory, by synchronizing signal amplitude level data showing the amplitude level of the synchronizing signal, and generating the synchronizing signal data; and an adder for adding the synchronizing signal data to the input image signal data.

2. The image signal data generator of claim 1, wherein the memory is so configured that pieces of relative synchronizing signal data corresponding to respective synchronizing signal patterns of plural kinds of image signal formats are stored, and a piece of relative synchronizing signal data selected by an image signal format selecting signal is read out.

3. The image signal data generator of claim 1, wherein the memory may be a read only memory or a register.

4. An image signal data generator for generating output image signal data by superposing synchronizing signal data on input image signal data, and outputting the output image signal data, the generator comprising:

a memory for storing first relative synchronizing signal data showing a ratio of a level of a first synchronizing signal corresponding to a first image signal format to an amplitude level, and associated relative synchronizing signal data, from which second relative synchronizing signal data showing a ratio of a level of a second synchronizing signal corresponding to a second image signal format to the amplitude level by being synthesized with the first relative synchronizing signal data is generated;

an adder for adding the first relative synchronizing signal data to the associated relative synchronizing signal data, and generating the second relative synchronizing signal data;

a multiplier for multiplying the first relative synchronizing signal data or the second relative synchronizing signal data, by synchronizing signal amplitude level data showing the amplitude level, and generating first or second synchronizing signal data; and a superposing unit for superposing the first or second synchronizing signal data on the input image signal data.

5. An image signal data generator for generating output image signal data by superposing synchronizing signal data on input image signal data, and outputting the output image signal data, the generator comprising:

a memory for storing first relative synchronizing signal data showing a ratio of a level of a first synchronizing signal corresponding to a first image signal format to an amplitude level, and associated relative synchronizing signal data showing a ratio of a level of associated synchronizing signal data to the amplitude level, wherein from the associated synchronizing signal data, by being synthesized with the first synchronizing signal data showing the first synchronizing signal level, second synchronizing signal data showing a second synchronizing signal level corresponding to a second image signal format is generated;

a multiplier for multiplying each of the first relative synchronizing signal data and the associated relative synchronizing signal data, by synchronizing signal amplitude level data showing the amplitude level, respectively, and generating the first synchronizing signal data and the associated synchronizing signal data;

an adder for adding the first synchronizing signal data to the associated synchronizing signal data, and generating the second synchronizing signal data; and a superposing unit for superposing the first synchronizing signal data or the second synchronizing signal data on the input image signal data.

* * * * *